United States Patent
Tiwari et al.

(10) Patent No.: US 12,181,962 B2
(45) Date of Patent: *Dec. 31, 2024

(54) INTELLIGENT NETWORK OPERATION PLATFORM FOR NETWORK FAULT MITIGATION

(71) Applicant: Accenture Global Solutions Limited, Dublin (IE)

(72) Inventors: Sanjay Tiwari, Bengaluru (IN); Shantha Maheswari, Bangalore (IN); Surya Kumar Ivg, Chennai (IN); Mathangi Sandilya, Bangalore (IN); Gaurav Khanduri, Sydney (AU); Shubhashis Sengupta, Bangalore (IN); Marcio Miranda Theme, Tokyo (JP); Badarayan Panigrahi, Bangalore (IN); Tarang Kumar, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/333,094

(22) Filed: Jun. 12, 2023

(65) Prior Publication Data

US 2023/0367669 A1    Nov. 16, 2023

Related U.S. Application Data

(63) Continuation of application No. 17/557,038, filed on Dec. 20, 2021, now Pat. No. 11,714,700, which is a
(Continued)

(30) Foreign Application Priority Data

Jun. 19, 2020 (IN) .............................. 202041026007

(51) Int. Cl.
*G06F 11/07* (2006.01)
*G06N 5/04* (2023.01)
*G06N 20/00* (2019.01)

(52) U.S. Cl.
CPC ........ *G06F 11/079* (2013.01); *G06F 11/0709* (2013.01); *G06F 11/0751* (2013.01);
(Continued)

(58) Field of Classification Search
None
See application file for complete search history.

(56) References Cited

U.S. PATENT DOCUMENTS

| 6,233,449 B1 | 5/2001 | Glitho et al. |
| 10,263,836 B2 | 4/2019 | Jain et al. |

(Continued)

OTHER PUBLICATIONS

European Patent Office, Communication, Extended European Search Report issued for European Application No. 20204337.8, dated Mar. 25, 2021, 8 pages.

*Primary Examiner* — Syed A Roni

(57) ABSTRACT

Provided are systems, methods, and computer-readable storage media that leverage artificial intelligence and machine learning to identify, diagnose, and mitigate occurrences of network faults or incidents within a network. Historical network incidents may be used to generate a model that may be used to evaluate real-time occurring network incidents, such as to identify a cause of the network incident. Clustering algorithms may be used to identify portions of the model that share similarities with a network incident and then actions taken to resolve similar network incidents in the past may be identified and proposed as candidate actions that may be executed to resolve the cause of the network incident. Execution of the candidate actions may be performed under control of a user or automatically based on
(Continued)

execution criteria and the configuration of the fault mitigation system.

20 Claims, 4 Drawing Sheets

Related U.S. Application Data continuation of application No. 17/000,081, filed on Aug. 21, 2020, now Pat. No. 11,204,824.

(52) U.S. Cl.
CPC .......... *G06F 11/0793* (2013.01); *G06N 5/04* (2013.01); *G06N 20/00* (2019.01)

(56) References Cited

U.S. PATENT DOCUMENTS

| | | |
|---|---|---|
| 2009/0106278 A1 | 4/2009 | Ramacher et al. |
| 2019/0089577 A1 | 3/2019 | Misra et al. |
| 2019/0132191 A1 | 5/2019 | Mann et al. |
| 2020/0057953 A1 | 2/2020 | Livny et al. |

INTELLIGENT NETWORK OPERATION PLATFORM FOR NETWORK FAULT MITIGATION

CROSS-REFERENCE TO RELATED APPLICATIONS

This application is a continuation of U.S. patent application Ser. No. 17/557,038 filed Dec. 20, 2021 and entitled "INTELLIGENT NETWORK OPERATION PLATFORM FOR NETWORK FAULT MITIGATION," issued Aug. 1, 2023 as U.S. Pat. No. 11,714,700, and a continuation of U.S. patent application Ser. No. 17/000,081 filed Aug. 21, 2020 and entitled "INTELLIGENT NETWORK OPERATION PLATFORM FOR NETWORK FAULT MITIGATION," issued Dec. 21, 2021 as U.S. Pat. No. 11,204,824, which claims the benefit of priority from Indian Provisional Application No. 202041026007 filed Jun. 19, 2020, and entitled "INTELLIGENT NETWORK OPERATION PLATFORM FOR 5G NETWORKS," which are incorporated herein by reference in their entirety.

TECHNICAL FIELD

The present invention relates generally to network fault resolution techniques and more specifically to systems and methods that leverage machine learning and artificial intelligence to rapidly identify, diagnose, and mitigate causes of network faults.

BACKGROUND OF THE INVENTION

Network technology advancements have resulted in rapid deployment and adoption of network services and functionality. For example, the services and functionality provided by voice communication networks (e.g., 4th Generation (4G) and 5G communication networks), content distribution networks, enterprise and cloud-services networks, and the like have become widespread and play a vital role in the way we work, communicate, and consume audio and video content. However, the expanded capabilities of such networks due to these advancements are not without drawbacks. For example, networks have become increasingly complex, often incorporating many different types of devices, topologies, communication protocols, and hardware from different vendors, which has made it more difficult to diagnose and resolve any network incidents (e.g., faults, errors, loss of services, and the like). When these network incidents occur, services provided by the network(s) may be unavailable or function improperly, creating problems for the users and devices supported by the network(s).

Many complex networks today are managed from a network operations center (NOC), which may be a centralized location from which network administrators manage, control and monitor one or more networks and the services those networks provide. While existing technologies provide mechanisms to detect network incidents when they occur, handling the large number of alarms raised by network incidents in today's complex networks presents significant challenges with respect to determining the causes of each network incident and how each incident should be resolved. Presently available techniques often rely on excessive manpower (e.g., allocating many individuals to diagnose and resolve network incidents) and static knowledge databases to determine how to resolve network incidents and ultimately implement the determined solution(s) for each individual alarm. Often the overall process consumes long durations of time in order to resolve each network incident.

The problems described above present significant challenges with many newer network technologies, such as 5G networks. As a result, improved techniques for identifying and resolving network incidents are needed, especially considering that these newer network technologies are increasingly being used to support mission critical applications that demand high availability of the networks. For example, as 5G network deployments expand, it is expected to bring about a 50-60% increase in total number of network related incidents (e.g., due, at least in part to increased deployment of devices relying on machine-to-machine (M2M) communications and Internet of Things (IoT) devices). Legacy solutions for resolving such network incidents may lead to severe service degradations and take significant amounts of time to resolve. Additionally, previous networks (e.g., 3G, 4G/LTE, networks, etc.) may experience less noise than next generation networks. One reason more noise may occur in next generation networks is that those networks may rely more on virtualization of network functionality and services as compared to previous networks. This increased noise may make it more difficult to diagnose and take corrective actions when network incidents occur.

BRIEF SUMMARY OF THE INVENTION

The present invention is directed to systems, methods, and computer-readable storage media that leverage artificial intelligence and machine learning techniques to create and train models that may be used to evaluate network incidents and determine actions that may be performed to resolve the network incidents. Historical network incident data may be analyzed using artificial intelligence processes to identify clusters of network incidents having similarities. The clusters may be used to generate models of the historic network incident data that may be used to identify root causes of network incidents. Based on the identified cause(s) of the network incident, historic network incident resolutions may be evaluated to identify candidate actions that may be taken to resolve network incidents in real-time.

Machine learning processes may be used to evaluate the candidate actions, such as to assign a score to the candidate action(s) and/or to classify the candidate action(s) into one of a plurality of categories. The score and/or the classification may be used to resolve the network incident. For example, when a score associated with an action satisfies a threshold score, embodiments may automatically execute the action predicted to resolve the network incident. Where the score does not satisfy the threshold score (or in embodiments where automatic execution is not utilized or utilized in a more limited fashion), a notification identifying the one or more candidate actions may be transmitted to a user (e.g., an information technology (IT) or network administrator) and presented in a graphical user interface. The graphical user interface may include interactive elements that allow the user to execute at least one of the candidate actions, where the actions may be performed remote to the node or portion of the network where the network incident occurred, such as from a NOC supporting the network.

As actions are executed, the system may monitor the network to ensure that the action(s) resolved the network incident. If an action did not resolve the incident, additional candidate actions may be executed until the network incident is resolved. Information associated with network incidents resolved using the techniques disclosed herein may be provided as feedback that may be incorporated into the historical data and used to train the models and machine learning/artificial intelligence processes so that future network incidents may be more rapidly diagnosed and resolved.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE INVENTION

Embodiments of the present disclosure provide techniques for rapid identification of network incident causes and diagnosis of actions that may be executed (e.g., locally or remotely) to mitigate the causes of the network incidents. Using machine learning and artificial intelligence techniques, embodiments leverage historic network incidents data to determine the action(s) that may be executed to resolve the network incident cause. The network may be monitored for a period of time after execution of the action to ensure the cause of the network incident is resolved and additional actions may be executed if previous actions were unsuccessful in mitigating the cause of the network incident. The concepts disclosed herein may enable network faults to be resolved more rapidly and allow emerging network incidents (e.g., network incidents that have not previously occurred or occur infrequently) to be identified, resolved, and taken into consideration in the future, which may play a critical role in resolving issues that occur as network technologies continue to evolve and become more complex.

Figure 1:
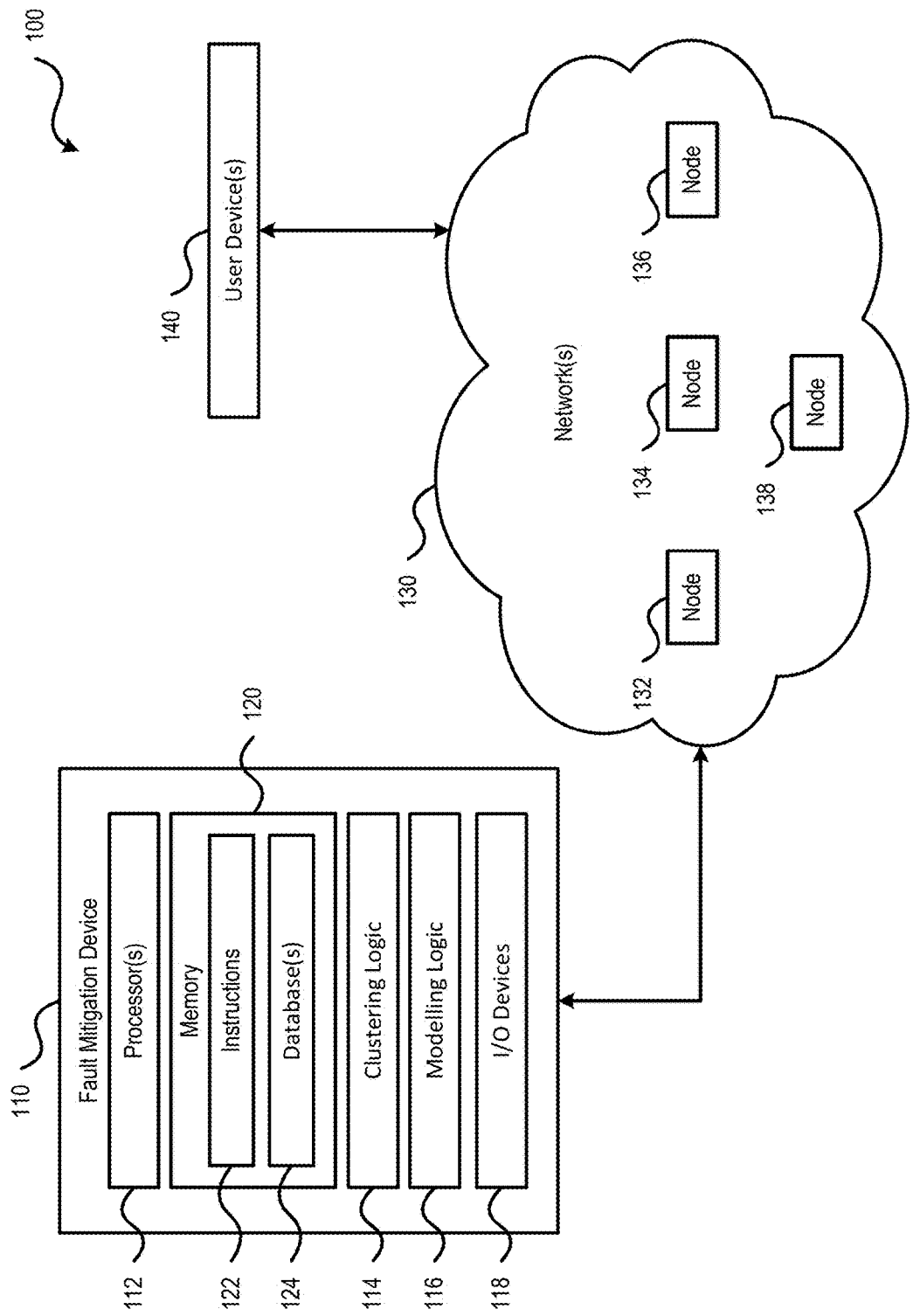
FIG. 1 shows a system for diagnosing and resolving network incidents according to embodiments of the present invention.

Referring to FIG. 1, a system for diagnosing and resolving network incidents in accordance with aspects of the present disclosure is shown as a system 100. As shown in FIG. 1, the system 100 includes a fault mitigation device 110. The fault mitigation device 110 may be communicatively coupled to one or more networks 130. Additionally, the fault mitigation device 110 may be communicatively coupled to one or more user devices 140 via the one or more networks 130. The fault mitigation device 110 may be configured to monitor at least one network of the one or more networks 130 for faults (e.g., network errors or issues that may result in degraded network performance, loss of network services, or other issues) and initiate operations to mitigate any detected faults. Operations to mitigate detected faults may include providing recommendations associated with one or more actions configured to resolve or correct a detected fault to the user device(s) 140, which may be devices operated by information technology (IT) or network administration personnel responsible for maintaining the network and the nodes supporting the network. In aspects, operations to mitigate the detected faults may also include automatic correction of detected faults detected by the fault mitigation device 110. Additional details regarding the above-mentioned features and functionality of the fault mitigation device 110 are described in more detail below.

The fault mitigation device 110 includes one or more processors 112, clustering logic 114, modelling logic 116, one or more input/output (I/O) devices 118, and a memory 120. Each of the one or more processors 112 may be a central processing unit (CPU) having one or more processing cores or other computing circuitry (e.g., a microcontroller, one or more application specific integrated circuits (ASICs), and the like). The memory 120 may include read only memory (ROM) devices, random access memory (RAM) devices, one or more hard disk drives (HDDs), flash memory devices, solid state drives (SSDs), network attached storage (NAS) devices, other devices configured to store data in a persistent or non-persistent state, or a combination of different memory devices. The memory 120 may store instructions 122 that, when executed by the one or more processors 112, cause the one or more processors 112 to perform the operations described in connection with the fault mitigation device 110 with reference to FIGS. 1-4. Additionally, the memory 120 may store one or more databases 124 that support operations of the fault mitigation device 110. Exemplary aspects of the types of information that may be stored in the one or more databases and how that information may be used by the fault mitigation device 110 are described in more detail below.

The I/O devices 118 may include one or more display devices, a keyboard, a stylus, one or more touchscreens, a mouse, a trackpad, a camera, one or more speakers, haptic feedback devices, or other types of devices that enable a user to receive information from or provide information to the fault mitigation device 110. Additionally, the I/O devices 118 may include one or more communication interfaces configured to communicatively couple the fault mitigation device 110 to the one or more networks 130 via wired or wireless communication links according to one or more communication protocols or standards (e.g., an Ethernet protocol, a transmission control protocol/internet protocol (TCP/IP), an institute of electrical and electronics engineers (IEEE) 802.11 protocol, and an IEEE 802.16 protocol, a 3rd Generation (3G) communication standard, a 4th Generation (4G)/long term evolution (LTE) communication standard, a 5th Generation (5G) communication standard, and the like).

In an aspect, the fault mitigation device 110 may be provided as part of a network operations center (NOC) infrastructure providing a centralized framework for managing networks and network nodes, which may include public and private networks operated by an entity (or group of entities) and that may span across different geographic regions. It is noted that while described with reference to FIG. 1 as a "device," the functionality provided by the fault mitigation device 110 may also be implemented via software (e.g., the instructions 122) running on the NOC infrastructure or as a software layer that sits between the NOC infrastructure and the network.

In aspects, the one or more networks 130 may include a plurality of nodes, such as nodes 132, 134, 136, 138. The nodes of the network may include physical devices, such as routers, relays, switches, base stations (e.g., evolved node-Bs (eNBs), next generation node-Bs (gNBs), femtocells, picocells, etc.), servers (e.g., data servers, web servers, etc.), security appliances, user devices, or other devices configured to provide functionality and services to one or more end users (e.g., employees of an organization, consumers accessing websites, communication service subscribers, and the like). The nodes of the one or more networks 130 may also include virtual nodes (e.g., virtual network devices providing functionality and/or services to the users of the network(s)). It is noted that the nodes monitored by the fault mitigation device 110 may be nodes operating within a network controlled by an entity that operates the fault mitigation device 110 but that the one or more networks 130 may include other nodes that are part of other networks. For example, an organization may have LANs, WANs, and other types of network infrastructure configured to connect nodes of the organization to each other to facilitate intra-organization communication, but the organization's networks and nodes may also transmit and receive communications over external networks and nodes, such as networks and nodes providing the organization with access to the Internet or other public communication networks and services. It is noted that the fault mitigation and mitigation techniques described herein may be capable of detecting whether faults are the result of nodes within an organization's network, which the fault mitigation device 110 may provide functionality and processes to correct, and faults that occur due to failures and issues arising in nodes external to the organization's network nodes.

The one or more user devices 140 may include computing devices associated with an entity's network administration or IT personnel. The user devices 140 may include desktop computing devices, laptop computing devices, smartphones, personal digital assistants (PDAs), tablet computing devices, or other types of devices operable to perform the operations described herein with reference to the one or more user devices 140. It is noted that such computing devices may include one or more processors, memory, I/O devices, or other components supporting the functionality and operations described herein.

In aspects, the system 100 may also include other devices 150. The other devices 150 may include Internet of things (IoT) devices, vehicles (e.g., cars, trucks, boats, planes, etc.), or other types of devices that may include a communication capability. In an aspect, one or more of these types of devices may be combined. To illustrate, a vehicle may include IoT devices, such as sensors, that generate data related to operations of the vehicle (e.g., speed, temperature, tire pressure, location data, or other types of information) and the generated data may be transmitted to an external system (e.g., the fault mitigation device 110) via the one or more networks 130. The fault mitigation device 110 may be configured to receive data from the other devices 150 and utilize that data to identify, diagnose, and correct faults within a network, as described in more detail below.

As briefly described above, the fault mitigation device 110 may be configured to detect and mitigate (e.g., diagnose and resolve) faults occurring within at least one network of the one or more networks 130. When a fault occurs in a network, an alarm message may be generated (e.g., by one or more network monitoring devices) and transmitted to fault mitigation device 110 or may be transmitted to the NOC infrastructure and intercepted or detected by the fault mitigation device 110. The alarm message may include one or more parameters associated with the fault that triggered generation of the alarm and may be generated by one or more of the nodes 132, 136, 134, 138 (or other nodes of the one or more networks 130), by the user device 140, or by the other device(s) 150. It is noted that in some instances multiple alarm messages may be generated for a single fault. To illustrate, if a base station of a cellular network (e.g., an evolved nodeB (eNB) of a 4G/LTE network or a next generation nodeB (gNB) of a 5G network) goes down, neighboring base stations (e.g., nodes of the network) may generate alarm messages indicating one of their neighboring base stations is unavailable. Additionally, the user device(s) 140 and other devices 150 served by the base station that went down may also generate alarm messages that may be received by the fault mitigation device 110. The base station may also generate an alarm message. Each of these alarm messages may be received by the fault mitigation device 110 and used to detect, diagnose, and mitigate the fault within the network (e.g., the cause of the base station going down). It is noted that some of the alarm messages may be related to symptoms of the fault, such as the alarm messages generated by the devices served by the base station, and some of the alarm messages may be related to the cause of the fault, such as the alarm message received from the base station.

In an aspect, the parameters of the alarm message(s) may include a node parameter, an agent parameter, a summary parameter, an alert key parameter, and an alert group parameter. The node parameter may identify an entity or node from which the alarm originated, such as to identify one of the nodes 132, 134, 136, 138. The agent parameter may include information associated with a sub-manager that generated the alarm. For example, the nodes 132, 134, 136, 138 may include functionality configured to monitor the state of different aspects of the nodes. The monitoring functionality may include monitoring backhaul network connectivity of the node (e.g., a status of connectivity to the backhaul network), neighbor node monitoring (e.g., monitoring connectivity of one or more neighbor nodes), signal quality monitoring (e.g., monitoring a quality of signals transmitted by the node, which may be based on channel estimates received from served devices or other techniques), node performance monitoring (e.g., monitoring performance parameters of a node, such parameters associated with performance of CPUs, memory, etc.), node interface monitoring (e.g., monitoring individual ports/interfaces of a node, such as a X2 interface, a S1 interface, etc.), or other types of monitoring functionality. The monitoring functionality may be provided via software agents running on one or more processors of the nodes and/or dedicated hardware based monitoring devices. When a problem is detected with the operations of a node, the monitoring functionality may generate the alarm message, which may identify the agent/hardware device generating the alarm message (or triggering generation of the alarm message) in the agent parameter.

The summary parameter may include information representative of the alarm condition and one or more managed object instances affected by the alarm condition. For example, where a base station experiences a hardware failure, the summary parameter may include information that indicates a hardware component (e.g., a transmitter, etc.) has failed, and where the base station experiences a service or software failure, the summary parameter may include information that indicates the service or software process that failed. In an aspect, each alarm type may be defined in a Management Information Base (MIB) of a device type belonging to a particular vendor and may be configured in the nodes of the network. Based on a specific Object Identifier (OID) generated from the node, the monitoring agent populates the alarm summary field with relevant values. The alert key parameter may indicate the managed object instance referenced by the alarm message, and the alertgroup may include information descriptive of the failure type indicated by the alarm message. In an aspect, the alert key may contain a descriptive key that indicates the object instance referenced by the alarm. The alert key may be a SNMP instance of the managed object represented by the alarm. Usually, this can be obtained by extracting the instance from the OID of one of the trap's variable bindings. The value of the alert key may be used to ensure proper deduplication of alarms. For example, a link down alarm may have an alert key defined as LINK DOWN. The alert group may indicate the value under which a trap can be grouped, for example, AUTHENTICATION STATUS. It is noted that the exemplary parameters described above have been provided for purposes of illustration, rather than by way of limitation and that additional parameters, different parameters, or fewer parameters may be utilized by the concepts disclosed herein.

The fault mitigation device 110 may utilize the parameters of the alarm message to identify a cause associated with the alarm message. In an aspect, the parameters of the alarm message may be analyzed against a known error database (KEDB) to see if the parameters match any known errors. If the parameters match a known error, the cause of the error may be identified from the information stored in the KEDB and one or more actions to resolve the cause of the error may be determined based on the information stored in the KEDB. If the cause of the fault or error cannot be determined based on the KEDB, artificial intelligence processes may be applied to the parameters to diagnose and identify the cause of the fault and determine one or more actions to mitigate the fault.

The artificial intelligence processes may include clustering techniques and machine learning logic configured to analyze the parameters and determine a cause of the fault, as well as a confidence level associated with the determined cause. For example, the clustering logic 114 may be configured to determine one or more clusters based on the parameters and historical data, which may be stored at a historical database of the one or more databases 124. The historical data may include information associated with alarm conditions previously experienced within the relevant network over a period of time (e.g., 1 month, 6 months, 1 year, or some other time period). The clustering logic 114 may be configured to determine the clusters based on a nearest neighbors algorithm that is configured based on the parameters of the alarm message. During clustering, network incidents represented by the historical data may be arranged into clusters by the nearest neighbors algorithm of the clustering logic 114 based on a percentage of similarity in incident fields. Each incident in the historical data may include information associated with data similar to the parameters of the alarm message and the different clusters may correspond to incidents sharing the same or similar parameters.

To illustrate, a first cluster may correspond to network incidents or faults sharing similar parameters, which may be indicative of a first type or group of network incidents or faults, and a second cluster may correspond to network incidents sharing a different set of parameter similarities, which may be indicative of a second type or group of network incidents or faults. The different clusters may then be analyzed to determine which cluster is closest to the parameters of the received alarm message. For example, historic network incidents of a cluster sharing many similarities with respect to the parameters of a received alarm message may indicate that the alarm message is related to a cause of the historic network incidents associated with the cluster. The parameters of a received alarm/fault may be segregated within individual fields and the combination of such parameters may be compared across parameters of alarms/faults included in historical data. The compared alarms may be grouped together based on matching combinations of parameters to form unique clusters. Once the alarms are clustered, a known error database (KEDB) may be referenced to identify the cause of the alarm/fault on the basis of root cause analysis that was carried out for previous occurrences of alarms/faults sharing the same or similar sets of parameters. It is noted that terms utilized to describe the clustering logic such as "nearest neighbors" and "closest" are not intended to convey geographic distance or proximity and are instead used to describe the similarity between parameters of the network incidents or faults represented by the model created by the clustering logic 114 and/or similarities between the network incidents or faults represented by the model and the parameters of a received alarm message. For example, network incidents or faults represented by the different clusters may be associated with network nodes that are located at a single location or at many different geographic locations.

Figure 2:
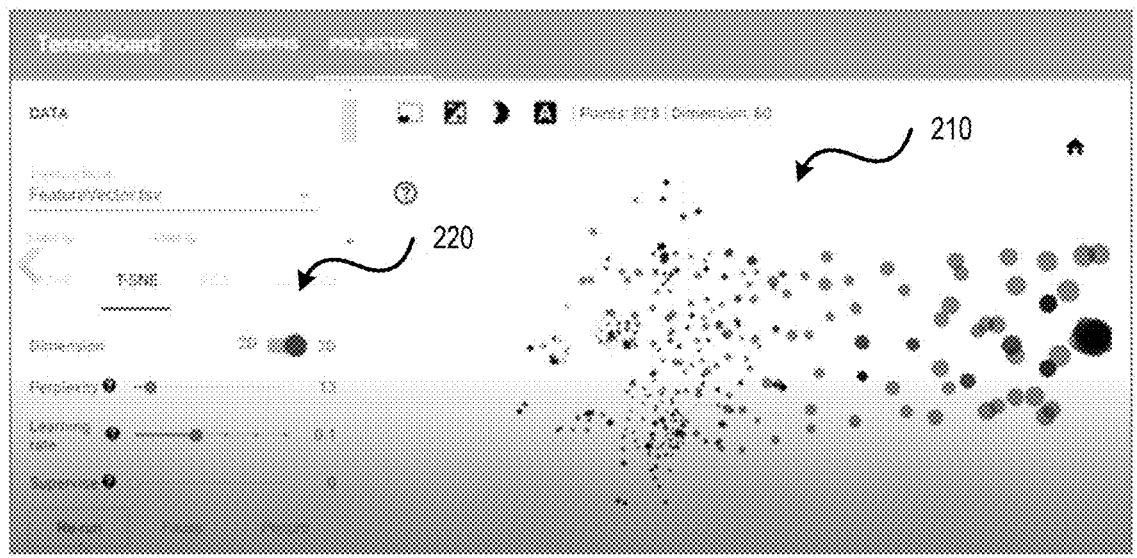
FIG. 2 shows a screenshot of an interface displaying a graphical representation of historical incident data according to embodiments of the present invention.
Figure 3:
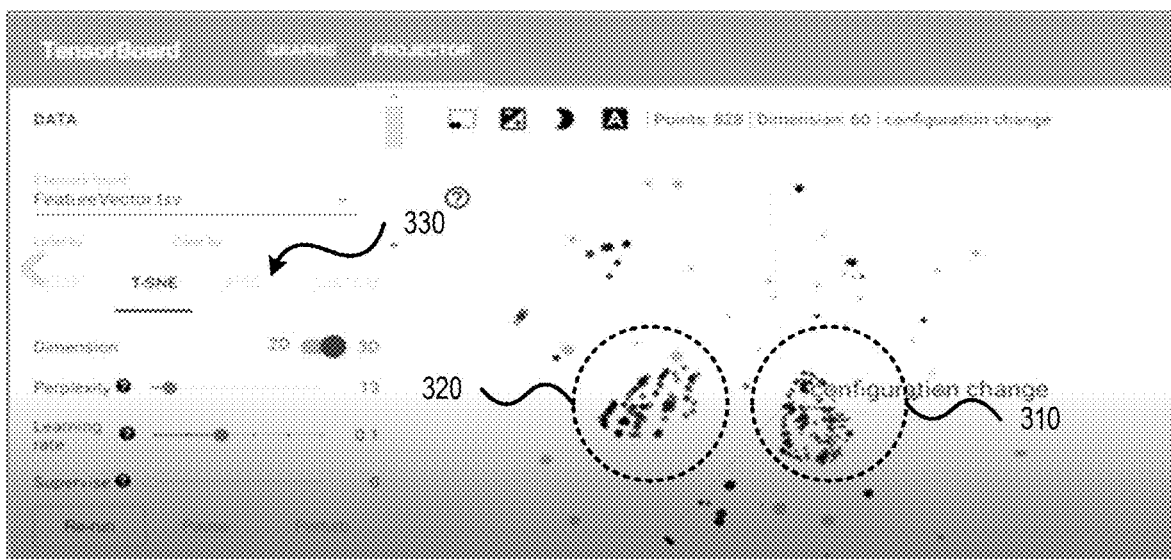
FIG. 3 shows a screenshot illustrating a graphical representation of clustered historical incident data according to embodiments of the present invention.

Referring briefly to FIGS. 2 and 3, screenshots illustrating exemplary aspects of clustering network incidents are shown. In FIG. 2, a screenshot of an interface displaying a graphical representation of historical incident data is shown at 210. The graphical representation shown in FIG. 2 may be part of a graphical user interface that may be presented to a user (e.g., a user of the user device 140 of FIG. 1) and may provide one or more controls 220 for interacting with and manipulating the graphical representation. In FIG. 3, a screenshot illustrating a graphical representation of clustered historical incident data is shown and includes two exemplary clusters 310, 320. The cluster 310 may correspond to a first type of network incident while the cluster 320 may correspond to a second type of network incident. To illustrate, the cluster 320 may correspond to network incidents that occurred as the result of a configuration change to one or more network nodes while the cluster 310 may correspond to network incidents that were caused by something other than a configuration change. The graphical representation shown in FIG. 3 may be part of a graphical user interface that may be presented to a user (e.g., a user of the user device 140 of FIG. 1) and may provide one or more controls 330 for interacting with and manipulating the graphical representation. It is noted that the one or more controls 220 of FIG. 2 and the one or more controls 330 of FIG. 3 may include the same controls, completely different sets of controls, or a combination of common and unique controls relevant to the graphical representation being displayed.

Referring back to FIG. 1, in an aspect, the clustering may be performed iteratively. For example, a first iteration may achieve a loose clustering but the historical data may not be sufficiently grouped such that specific clusters represent groups of similar incidents. A second iteration may result in a finer clustering granularity with well-defined groups starting to form. The clustering logic 114 may continue to execute the nearest neighbors algorithm (or another clustering technique or combination of techniques) until well defined clusters have been achieved with respect to the historical data (e.g., until clusters represent network incidents having a threshold degree of similarity). Each of the clusters identified by the clustering logic 114 may represent a different fault group and the network incidents within a cluster may share similarities with each other (e.g., similar network incidents, parameters, nodes, networks, network incident causes, and the like).

Once clustering is complete (whether multiple iterations are performed or a single iteration), the modelling logic 116 may analyze the clusters and information derived from the analysis may be compiled into a model. In an aspect, the model may be a multi-dimensional array, such as a 60-dimensional array, representing similarities between network incidents within each cluster. The model may facilitate analysis of historical network incidents to identify and evaluate hidden patterns within the historical data, such as to identify instances where a similar type of incident could have been updated with different values. In an aspect, when an alarm is resolved by an NOC operator or field engineer, notes associated with the alarm may be recorded that describe the resolved error or fault and over time similar types of faults may result in similar types of notes, which may help with the identification of pattern relationships and meaning of similar resolution notes for the fault occurrence, which may aid in achieving effective clustering. It is noted that while FIG. 1 shows the clustering logic 114 and modelling logic 116 as different logical blocks of the fault mitigation device 110, it is to be understood that such depiction has been provided for purposes of illustration, rather than by way of limitation and that the functionality provided by the clustering logic 114 and the modelling logic 116 may be integrated (e.g., as clustering and modelling logic). Moreover, it should be understood that the functionality provided by the clustering logic 114 and the modelling logic 116 may be stored as instructions, such as the instructions 122, executable by the one or more processors 112 to perform the operations described herein with respect to the clustering logic 114 and the modelling logic 116.

Additionally, the model may be used to identify or determine corrective actions for a current fault experienced within the system 100, such as to identify corrective actions that may be utilized to address the network incident or fault corresponding to the alarm message received by the fault mitigation device 110. For example, the fault mitigation device 110 may evaluate the received alarm message to perform a root cause analysis. The root cause analysis may result in identification of a parent or primary alarm. Once the parent or primary alarm is identified, the parameters included in the alarm message may be evaluated against the model to determine one or more candidate actions that may be performed to resolve the issues related to the alarm message. For example, an artificial intelligence process may analyze the model using a nearest neighbor algorithm to find historical network incidents corresponding to the parameters of the alarm message, as described above. Actions corresponding to the historical network incidents identified by the artificial intelligence process may then be identified, such as by retrieving the actions for the historical network incidents from an actions database (e.g., one of the one or more databases 124) that includes information associated with actions taken to resolve the alarms corresponding to the historical network incidents. The set of actions may represent a set of candidate actions that may be performed to resolve the network incident that triggered generation of the alarm message.

A score may be determined for each of the one or more candidate actions, where the score represents a likelihood that a particular candidate action will resolve the cause of the alarm message. The score may be determined based on a degree of similarity between the parameters of the alarm message and the historical network incidents identified by the artificial intelligence process. For example, the score may be determined based on a metric representing the degree of closeness between the parameters of a received alarm message and one or more network incidents of a cluster determined to be similar to the incident associated with the alarm message. In an aspect, the score may represent a confidence interval.

Once the candidate actions are determined and the scores are calculated, the fault mitigation device 110 may be configured to determine whether to provide a notification regarding the alarm message to the user device 140 or perform the candidate action(s) automatically. For example, where the score for a candidate action satisfies a threshold score, the fault mitigation device 110 may automatically execute at least one candidate action to resolve the cause of the alarm message, but where the score for the candidate action does not satisfy the threshold score, the fault mitigation device 110 may transmit a notification to the user device 140 that identifies the action. The threshold score may correspond to a score that indicates a very high probability or likelihood the associated candidate action will resolve a suspected cause of the alarm message (e.g., a 95% chance or higher, a 90% chance or higher, a 85% chance or higher, etc.), such that actions associated with scores greater than or equal to the threshold score may be automatically executed and actions associated scores less than the threshold score may be transmitted to a user via the notification. In some aspects, all actions may be transmitted to the user device 140 for review by a user prior to the action being executed.

When the action is communicated to a user via the notification, the notification may be presented to the user in a graphical user interface. The interface may enable the user to view the alarm message parameters, the parent or primary cause of the alarm message, the action suggested to resolve the alarm, and the score. The interface may also provide interactive elements to execute the action identified in the notification. For example, if the action is to restart a device that is causing the alarm, the notification may be presented within the interface with interactive elements that may be selected or activated by the user to restart the device. It is noted that the actions used to resolve network incidents may be executed remote from the source. To illustrate, the user device 140 may located at a first location and the node of the network causing the alarm may be located at a location that is geographically remote from the first location. In such cases, activation of the interactive element presented at the graphical user interface may cause one or more commands to be transmitted over a network to the node that caused the alarm message to be created. The one or more commands may correspond to commands to execute the action identified by the artificial intelligence process, as described above.

In an aspect, the fault mitigation device 110 may be configured to categorize the network incident associated with the alarm prior to transmitting a notification to the user device 140 or automatically executing any candidate actions. For example, the fault mitigation device 110 may be configured to classify the network incident as one of: a no trouble found (NTF) category, a self-healable category, and a non-self-healable category. The NTF category may be used for network incidents arising from problems that occur due to minor fluctuations in networks or interconnections which are (typically) found okay (e.g., after analysis). As an example of an NTF fault, a flapping fault may be the result of a loose interface connection which triggers multiple faults or a spike in performance parameters such as CPU, memory, etc. that does not have an impact on a node or cause the node to become defunct. The self-healable known issues category may be used for network incidents associated with recurring issues in the network for which a resolution is known and may be executed remotely (e.g., without having to physically be present at the node of the network). For example, a rogue process running in the network equipment or node is an example of a self-healable fault and can be remotely stopped or killed by logging in through the command line interface or via execution of an automated script configured to terminate the rogue process. The non-self-healable category may be used for recurring network issues for which the resolution may be known but cannot be executed without physically troubleshooting the cause of the issue(s) or being present at the node. Non-self-healable network incidents may require analysis and troubleshooting by a user (e.g., an IT or network administrator) or replacement/repair of hardware components of the node. It is noted that the exemplary categories described above have been provided for purposes of illustration, rather than by way of limitation and that other categories and classifications may be utilized in accordance with the concepts disclosed herein, such as a category associated with unknown network incidents or a category for network incidents for which there is no known action that may be taken to resolve the network incident.

When categorization is utilized, the categorization of a network incident may be used to determine how the action(s) is executed. For example, if the network incident is categorized as NTF, the fault mitigation device 110 may evaluate the network or interconnections associated with the node or nodes associated with the alarm message and clear the alarm if the network incident was simply the result of minor fluctuations in the network (e.g., the node(s) or network connections appear to be operating correctly when evaluated by the fault mitigation device 110). If the fault mitigation device 110 is not able to analyze the network or interconnections, the fault mitigation device 110 may transmit a notification associated with the alarm message to the user device 140 and the user may analyze the contents of the notification and the relevant portions of the network to determine whether to clear the alarm. Self-healable known issue network incidents may be handled in a similar fashion. For network incidents categorized as non-self-healable, the fault mitigation device 110 may identify a specific user or team of users that should be notified of the network incident and may transmit a notification to the identified user(s). The identified users may be determined based on whether those users have experience resolving the identified network incident. For example, the historical data may be analyzed to determine one or more users that have handled similar previous network incidents. Determining the user(s) based on analysis of historical network incidents may enable the user(s) responsible for resolving the network incident to be identified more rapidly (e.g., as compared to having a supervisor manually inquire as to which members of the IT or network administration team have appropriate experience resolving the network incident, as is currently done in industry practice) and may result in the network incident being resolved more quickly and efficiently.

It is noted that the categorization of network incidents may also be utilized in combination with the scoring concept described above. For example, a NTF or self-healable network incident may be automatically executed by the fault mitigation device 110 if the score associated with a candidate action satisfies the threshold score, but actions not satisfying the threshold score may transmitted via one or more notifications to users for confirmation (e.g., via the interactive elements of the interface in which the notification is displayed) prior to executing any actions.

In an aspect, where more than one candidate action for resolving a network incident is identified, the notification may identify the multiple actions and the user (or fault mitigation device 110) may perform the actions one at a time until the network incident is resolved. For example, the candidate actions may be ranked based on their respective scores (or another metric) and then executed (e.g., by a user via interactive elements presented in the interface or automatically by the fault mitigation device 110) according to the rankings. In such a scenario, the highest ranked candidate action may be executed first and an evaluation may be performed to determine whether that candidate action resolved the network incident. If the incident was resolved, the alarm may be cleared and no further candidate actions may be executed. If, however, the incident was not resolved, the next highest ranked candidate action may be executed and evaluated to determine whether the incident was resolved by the second action. This process may continue until either all candidate actions have been executed or the network incident is resolved. If all candidate actions are executed and the network incident is not resolved, the network incident may be referred to a user for manual investigation and resolution of the network incident (e.g., similar to the non-self-healable process described above).

In aspects, as network incidents are detected and resolved by the system 100, information associated with those resolved network incidents, whether resolved automatically or via technician intervention, may be incorporated into the historical data maintained by the one or more databases 124 and subsequently used to evaluate future network incidents. For example, suppose that a network incident that has not been encountered previously is observed by the fault mitigation device 110. The network incident may be evaluated using the above-described techniques, but since there are no known actions to resolve the network incident, it may be referred to a user for manual resolution. Once resolved, information associated with the network incident, such as the parameters of the alarm message generated in response to detection of the network incident and actions taken to resolve the network incident, may be recorded to the historical database. Subsequently, this new data may be incorporated in the clustering and modelling processes described above, which may allow future instances of that network incident to be resolved automatically using the above-described techniques (e.g., assuming the resolution is not related to a hardware failure that requires a technician to visit the node and replace a physical component). As more occurrences of that network incident occur, the actions taken to resolve it may also be refined, such as if a better solution is identified for resolving the network incident, thereby allowing the system 100 to more accurately identify actions that may be taken to resolve network incidents and allowing network incidents to be resolved more rapidly.

The learning capabilities of the fault mitigation device 110 and the diagnosis and resolution processes described above may result in improved performance of the network(s) and the services and devices supported by the network(s) (e.g., less network down time, increased service availability, etc.). Additionally, using information about resolved network incidents as feedback into the machine learning and artificial intelligence processes described above allows similarities between different network incidents to be identified. It may also allow actions used to resolve one network incident to be identified as candidate actions for resolving network incidents sharing similar parameters but involving different nodes (or connections) within the network(s).

Figure 4:
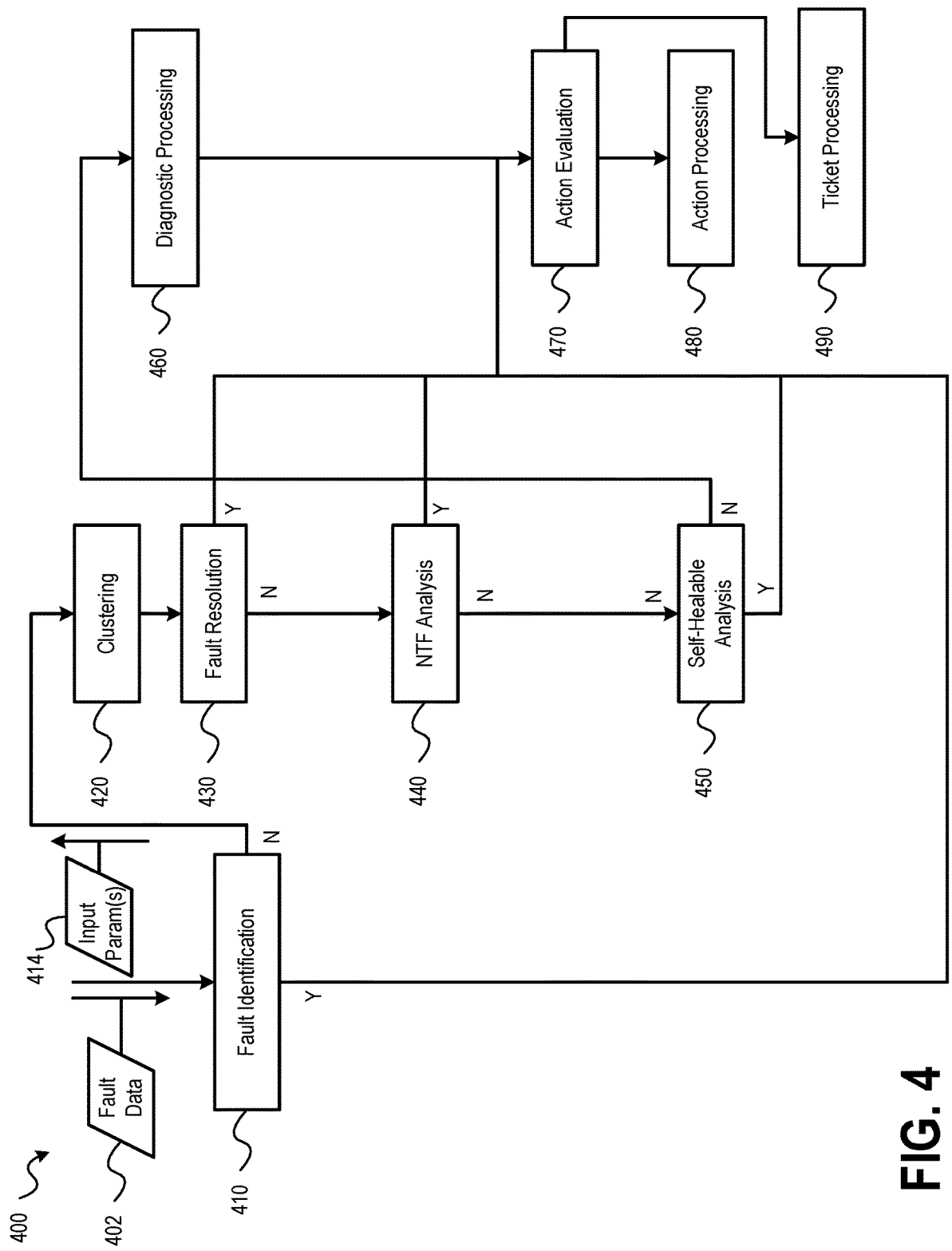
FIG. 4 is a block diagram illustrating aspects of fault mitigation processing according to embodiments of the present invention.

Referring to FIG. 4, a block diagram illustrating aspects of fault mitigation processing in accordance with aspects of the present disclosure is shown. It is noted that the representation of the fault mitigation processing illustrated in FIG. 4 are intended to provide a better understanding of the operations of the system 100 of FIG. 1 and the various ways in which network incident data may be processed in accordance with the concepts disclosed herein. In aspects, the exemplary processing of FIG. 4 may be performed by the system 100 of FIG. 1, such as by the fault mitigation device 110 of FIG. 1. The functionality described with respect to the various logical blocks shown in FIG. 4 may be provided by one or more processors (e.g., the one or more processors 112 of FIG. 1) or via software stored as instructions (e.g., the instructions 122 of FIG. 1) that may be executed by a processor to perform the operations described below.

As shown in FIG. 4, fault mitigation processing in accordance with the present disclosure may be initiated upon receiving fault data 402. The fault data 402 may be an alarm message, as described above with reference to FIG. 1 and may be received from a node of a network (e.g., one of the nodes 132, 134, 136, 138 of the one or more networks 130 of FIG. 1), from a device supported by the network (e.g., one of the other devices 150 of FIG. 1 or the user device 140 of FIG. 1, such as a user's smartphone device). Upon receiving the fault data 402, fault identification processing may be performed, at block 410. The fault identification processing may be configured to access information associated with known faults from a KEDB (e.g., one of the one or more databases 124 of FIG. 1) and determine whether the fault data 402 identifies one of the known faults recorded to the KEDB. If the fault data 402 identifies or corresponds to one of the known faults recorded to the KEDB (e.g., the outcome of fault identification processing is "Yes"), processing may proceed to block 470, where action evaluation processing is performed. The action evaluation processing may be configured to determine one or more actions to resolve the fault identified in the fault data 402. Exemplary aspects of the action evaluation processing 470 are described in more detail below.

If the fault data 402 does not identify or correspond to one of the known faults recorded to the KEDB (e.g., the outcome of fault identification processing 410 is "No"), input parameters 414 may be provided to block 420 for clustering processing. The input parameters 414 may include the parameters described above with reference to FIG. 1 (e.g., node parameters, agent parameters, summary parameters, alert key parameters, and alert group parameters). The clustering processing may be configured to generate one or more clusters of network incidents based on historic network incident data associated with previous network incidents, as described above with reference to clustering logic 114 of FIG. 1. For example, the clustering processing may be configured to generate groups of network incidents sharing similar combinations of parameters based on historic network incident data and compare the parameters 414 to historic network incident data to identify network incidents sharing similar parameters to the input parameters 414. In some aspects, the clustering processing may be iteratively performed to generate clusters based on the historic network incident data until it is divided into sufficiently distinct clusters, where each cluster represents a group of network incidents of a similar type or fault cause. Once the clusters are identified, the input parameters 414 may be analyzed against the clusters to identify a cluster that is closest to the input parameters 414. Identifying the cluster closest to the input parameters 414 may result in identification of historic network faults that have been encountered previously and information associated with the network faults of the identified cluster may be used to determine actions that may be taken to resolve the cause of the fault associated with the fault data 402.

Once the cluster is identified, fault resolution processing may be performed, at block 430. The fault resolution processing may be configured to analyze the network incidents corresponding to the cluster to determine if a resolution to the network fault associated with the cluster exists, such as by analyzing the data associated with the network incidents or faults of the cluster to determine whether actions taken to resolve the network faults corresponding to the identified cluster are known. If a resolution to the network fault exists (e.g., the outcome of fault resolution processing is "Yes"), the actions utilized to resolve the previous network incidents may be identified and provided to the action evaluation processing, at block 470. If a resolution to the network fault does not exist (e.g., the outcome of fault resolution processing is "No"), processing may proceed to NTF analysis, at block 440. The NTF analysis may be configured to determine whether the network fault can be classified as an NTF network fault (i.e., no trouble found). If the network fault is classified as an NTF network fault (e.g., the outcome of NTF analysis is "Yes"), processing may proceed to the action evaluation processing, at block 470.

If the network fault is not classified as an NTF network fault (e.g., the outcome of NTF analysis is "No"), processing may proceed to self-healable analysis, at block 450. The self-healable analysis may be configured to determine whether the network fault associated with the fault data 402 is self-healable. Self-healable network faults may be network faults that can be fixed remotely or without a technician visiting the node associated with the fault, such as by sending commands to the node via a network. If the network fault is classified as self-healable (e.g., the outcome of the self-healing analysis is "Yes"), processing may proceed to the action evaluation processing, at block 470.

If a resolution to the network fault is unknown (e.g., the outcome of fault resolution processing is "No") and the network fault associated with the fault data 402 is not classified as a NTF network fault or a self-healable network fault (e.g., the outcomes of NTF analysis and self-healable analysis are "No"), processing may proceed to block 460 for diagnostic processing. The diagnostic processing may be configured to perform diagnostic testing of the node to determine if the root cause of the network fault associated with the fault data 402 can be identified. For example, the diagnostic testing may involve obtaining information associated with a current configuration of the node (e.g., current software version, hardware components, etc.), performance information associated with the node (e.g., current and/or historic traffic experienced by the node, etc.), change logs associated with changes made to the node (e.g., software update history, replacement of components of the node, etc.), system logs, network devices, analysis or testing of topological interconnection among the network devices, analyzing the types of services being supported by network nodes or devices, and the like. The information obtained via the diagnostic testing may be analyzed to determine if a root cause of the network fault can be identified. If the root cause can be identified, one or more actions may be determined to resolve the cause of the network fault.

The action evaluation processing, at block 470, may be configured to determine one or more candidate actions for resolving the network fault. For example, where the fault is determined to be an NTF network fault, the action evaluation processing may determine that no action is necessary and may clear the alarm associated with the fault data 402. This is because NTF network faults may not actually be faults and may instead just be temporary disruptions of a network (e.g., due to a sudden and temporary spike traffic volume) that may be resolved automatically (e.g., as the sudden spike in traffic volume experienced by a network node subsides). If the fault is determined to be self-healable, the one or more candidate actions may be determined based on actions taken to resolve previous occurrences of similar faults and scores may be assigned to each candidate action. Because self-healable faults may be resolved remotely, the action evaluation processing may select one of the one or more candidate actions for execution and provide the selected candidate action to block 480 for action processing. The action processing may be configured to transmit commands to one or more nodes of the network and the command(s) may be configured to cause automatic execution of the selected action(s) determined by the action evaluation processing, such as to remotely initiate a reboot of the node, restart a process that has failed at the node, update software of the node, rollback a state of the node (e.g., restoring software of a node to a previous software version following a fault caused by a software change), terminate a rogue process running on the node, or other types of operations.

If the action evaluation processing determines the fault associated with the fault data 402 cannot be resolved automatically (i.e., is not self-healable or NTF), the one or more candidate actions may be provided to ticket processing, at block 490. The ticket processing may be configured to generate a notification or ticket that may be provided to a user (e.g., IT personnel) and may request that the user execute the action(s) determined by the action evaluation processing to resolve the cause of the fault associated with the fault data 402. To illustrate, the ticket processing may be configured to receive one or more commands determined by the action evaluation processing and generate a ticket that may be placed in a queue or transmitted directly to the user. The user responsible for handling the ticket may then review the actions and the fault data and perform the suggested actions to resolve the fault, such as to replace a failed hardware component or other action. It is noted that a ticket may also be generated where the diagnostic processing, at block 460, is unable to determine actions to resolve the network fault and in such instances the user responsible for the ticket may need to do further investigation to determine the cause of the network fault and possible actions to resolve it.

Where multiple actions are identified for resolving a network fault, the action evaluation processing may utilize the scores associated with each candidate action to determine an order in which the candidate actions should be executed. After a highest ranked or scored candidate action is executed the action evaluation processing may determine whether the executed action resolved the root cause of the network fault and if resolved, may clear the network fault associated with the fault data 402. If the executed action did not resolve the root cause of the network fault, a next highest ranked or scored action may be executed and this process may continue until all candidate actions have been performed or the network fault is resolved. In some instances, none of the candidate actions may result in the cause of the network fault being resolved and in such instances, a ticket may be issued (e.g., via ticket processing at block 490) so that a user may further investigate the fault and determine an action to resolve it.

As shown above, the process illustrated in FIG. 4 enables a system to leverage machine learning and artificial intelligence techniques to rapidly identify causes of network incidents and determine actions that may be executed (e.g., locally or remotely) to mitigate the causes of the network incidents. The artificial intelligence techniques may be used to analyze historic network incidents data to identify network incidents or faults that are similar to a newly occurring network fault and then determine action(s) that may be executed to resolve cause of the network incident. Additionally, the processing illustrated in FIG. 4 enables diagnostics to be performed dynamically on network nodes to determine causes of faults as well as monitoring of nodes of a network to verify that actions taken to resolve network faults actually solve the issues that caused the network fault (and execute additional actions when the issues are not solved). These features improve network fault mitigation systems by enabling network faults to be resolved more quickly, reducing network downtime, improving network service availability, and providing such systems with the ability to diagnose and mitigate new faults that may be incorporated into the artificial intelligence processing so that future occurrences of those faults may be automatically corrected in the future.

Figure 5:
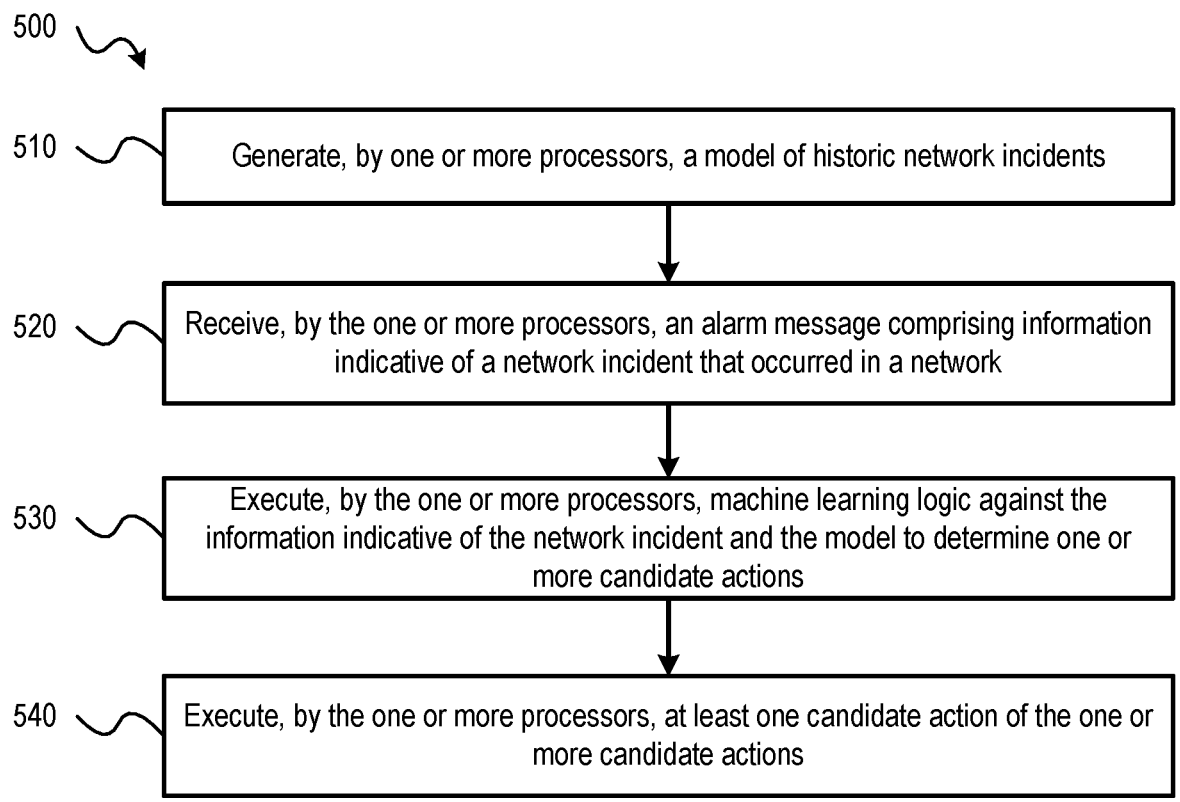
FIG. 5 is a flow diagram of a method for diagnosing and resolving network incidents according to embodiments of the present invention.

Referring to FIG. 5, a flow diagram of a method for diagnosing and resolving network incidents according to embodiments of the present invention is shown as a method 500. In aspects, the method 400 may be performed by a device, such as the fault mitigation device 110 of FIG. 1. Steps of the method 400 may be stored as instructions (e.g., the instructions 122 of FIG. 1) that, when executed by one or more processors (e.g., the one or more processors 112 of FIG. 1), cause the one or more processors to perform the steps of the method 500. It is noted that the method 500 may also incorporate the concepts described above with reference to FIGS. 2-4.

At step 510, the method 500 includes generating, by one or more processors, a model of historic network incidents. As described above with reference to FIG. 1, the model may be generated using modelling logic and may be used to evaluate network incidents that occur in a network, such as to identify historic network incidents that share similarities with a current network incident, such as historic network incidents that were caused by the same factors as the current network incident. In aspects, clustering logic may be used, at least in part, to generate the model, as described above. At step 520, the method 500 includes receiving, by the one or more processors, an alarm message comprising information indicative of a network incident that occurred in a network (e.g., a real-time occurrence of a network incident). As described above with reference to FIG. 1, the information indicative of the network incident may include a plurality of parameters.

At step 530, the method 500 includes executing, by the one or more processors, machine learning logic against the information indicative of the network incident and the model to determine one or more candidate actions. In an aspect, the method 500 may include executing clustering logic against historic network incident data, as described above with reference to FIG. 1. The clustering logic may be configured to identify a plurality of clusters associated with the network incidents represented by the historic network incidents data, where each cluster of the plurality of clusters may corresponding to a set of historic network incidents associated with a same network incident cause (e.g., a network configuration change, as described with reference to cluster 310 of FIG. 3). In an aspect, the machine learning logic may be configured to identify a cluster corresponding to the network incident based on similarities between the network incident and a set of historic network incidents corresponding to the cluster. For example, example, the clustering logic may include (i.e., implement) a supervised machine learning algorithm, such as the nearest neighbors algorithm described with reference to FIG. 1. The similarities may be determined based on identification of a cluster of historic network incidents sharing similar values for the plurality of parameters included in the alarm message. As described above with reference to FIG. 1, the one or more candidate actions determined in step 530 may be predicted to resolve a cause of the network incident. For example, historic network incidents in the identified cluster may be analyzed to determine actions taken to resolve the historic network incidents, which each share a similar cause to the network incident associated with the alarm message.

At step 540, the method 500 includes executing, by the one or more processors, at least one candidate action of the one or more candidate actions. As described above with reference to FIG. 1, the at least one candidate action may be executed automatically (e.g., by the fault mitigation device 110 of FIG. 1), or a notification (e.g., a message that includes information that identifies the one or more candidate actions) may be generated and transmitted to a user device and the at least one candidate action is executed in response to an input received from the user device. When executed based on the input, the input may correspond to activation of interactive elements presented within a graphical user interface of the user device, as described above with reference to FIG. 1. In an aspect, the at least one executed action may be determined based on a score assigned to the one or more candidate actions, based on a classification of the assigning a score for each candidate action of the one or more candidate actions, or based on both scores and the classification(s), as described above.

In an aspect, the method 500 may also include monitoring a network associated with the network incident to determine whether the at least one action that was executed (e.g., in step 440) resolved the cause of the network incident. If it is determined, based on the monitoring, that the at least one action did not resolve the cause of the network incident, another action of the one or more candidate actions may be executed. This process may continue until all candidate actions have been executed or the network incident has been resolved, whichever comes first.

In an additional aspect, the method 500 may include generating feedback data based on the at least one action executed to resolve the cause of the network incident. As described above, the feedback data may be used to update the historic network incident data and the model may be trained based on the feedback data. Incorporating the feedback data into the model may enable candidate actions to be identified more accurately (e.g., candidate actions may be more likely to resolve occurrences of network incidents) and new network incidents may be more readily integrated into the processes of the method 500 to mitigate future occurrences of those network incidents.

As shown above, the method 500 provides a technique for rapid identification of causes of network incidents and for automatically determining actions that may be executed (e.g., locally or remotely) to mitigate the causes of the network incidents. Using machine learning and artificial intelligence techniques, the method 500 enables historic network incidents data to be leveraged to determine a cause of a network fault and the action(s) that may be executed to resolve the cause of the fault. Additionally, the method 500 provides mechanisms for monitoring the network for a period of time after execution of the action to ensure the cause of the network incident is resolved and execute additional actions if previous actions were unsuccessful in mitigating the cause of the network incident. The method 500 enables network faults to be resolved more rapidly and allow emerging network incidents (e.g., network incidents that have not previously occurred or occur infrequently) to be identified, resolved, and taken into consideration in the future, which may play a critical role in resolving issues that occur as network technologies continue to evolve and become more complex.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, the scope of the present application is not intended to be limited to the particular embodiments of the process, machine, manufacture, composition of matter, means, methods and steps described in the specification.

What is claimed is:

1. A method for diagnosing and resolving network incidents, the method comprising:
receiving, by one or more processors, an alarm message comprising information indicative of a network incident that occurred in a network;
executing, by the one or more processors, machine learning logic against the information indicative of the network incident and a network incident cause model to determine one or more candidate actions,
the one or more candidate actions determined to resolve a cause of the network incident, and
the network incident cause model derived from a plurality of historic network data clusters that are each associated with a corresponding network incident cause; and
executing, by the one or more processors, at least one candidate action of the one or more candidate actions.

2. The method of claim 1, wherein each historic network data cluster of the plurality of historic network data clusters corresponds to a set of historic network incidents associated with a same network incident cause.

3. The method of claim 2, further comprising identifying a historic network data cluster corresponding to the network incident based on similarities between the network incident and the set of historic network incidents corresponding to the historic network data cluster.

4. The method of claim 3, wherein the information indicative of the network incident comprises a plurality of parameters and the similarities are based on the plurality of parameters.

5. The method of claim 1, wherein the at least one candidate action is executed automatically.

6. The method of claim 1, further comprising transmitting a notification to a user device that includes information that identifies the one or more candidate actions,
wherein the at least one candidate action is executed in response to an input received from the user device.

7. The method of claim 6, wherein the input corresponds to activation of an interactive element presented within a graphical user interface of the user device.

8. The method of claim 1, further comprising:
monitoring the network associated with the network incident to determine whether the execution of the at least one candidate action resolved a cause of the network incident; and
executing another action of the one or more candidate actions upon a determination, based on the monitoring, that the execution of the at least one candidate action did not resolve the cause of the network incident.

9. The method of claim 1, further comprising:
generating feedback data based on the execution of the at least one candidate action; and
updating the plurality of historic network data clusters based on the feedback data.

10. The method of claim 9, further comprising further training the network incident cause model based on the feedback data.

11. The method of claim 1, further comprising assigning a score for each candidate action of the one or more candidate actions, wherein the at least one candidate action is selected for the execution based at least in part on a score assigned to the at least one candidate action.

12. The method of claim 1, further comprising determining a classification for the network incident,
wherein the classification is selected from a plurality of classifications, and
wherein executing the at least one candidate action is based at least in part on the classification of the at least one candidate action.

13. A system comprising:
a memory; and
one or more processors communicatively coupled to the memory and configured to:
receive an alarm message comprising information indicative of a network incident that occurred in a network;
execute machine learning logic against the information indicative of the network incident and a network incident cause model to determine one or more candidate actions,
the one or more candidate actions determined to resolve a cause of the network incident, and
the network incident cause model derived from a plurality of historic network data clusters that are each associated with a corresponding network incident cause; and
execute at least one candidate action of the one or more candidate actions.

14. The system of claim 13, wherein:
each historic network data cluster of the plurality of historic network data clusters corresponds to a set of historic network incidents associated with a same network incident cause; and
the one or more processors are configured to identify a historic network data cluster corresponding to the network incident based on similarities between the network incident and the set of historic network incidents corresponding to the historic network data cluster.

15. The system of claim 14, wherein the one or more processors are further configured to:
determine one or more actions executed to resolve a cause of the set of historic network incidents, wherein the one or more candidate actions correspond to the one or more actions executed to resolve the cause of the set of historic network incidents.

16. The system of claim 13, wherein the one or more processors are configured to:
monitor the network associated with the network incident to determine whether the execution of the at least one candidate action resolved a cause of the network incident; and
execute another action of the one or more candidate actions upon a determination, based on the monitoring, that the execution of the at least one candidate action did not resolve the cause of the network incident.

17. The system of claim 13, wherein the one or more processors are configured to:
generate feedback data based on the execution of the at least one candidate action;
update the plurality of historic network data clusters based on the feedback data; and
update the network incident cause model based on the updated plurality of historic network data clusters.

18. A non-transitory computer-readable storage medium storing instructions that, when executed by one or more processors, cause the one or more processors to perform operations comprising:
receiving an alarm message comprising information indicative of a network incident that occurred in a network;

executing machine learning logic against the information indicative of the network incident and a network incident cause model to determine one or more candidate actions,
the one or more candidate actions determined to resolve a cause of the network incident, and
the network incident cause model derived from a plurality of historic network data clusters that are each associated with a corresponding network incident cause; and
executing at least one candidate action of the one or more candidate actions.

19. The non-transitory computer-readable storage medium of claim 18, wherein the executing of the at least one candidate action resolves the cause of the network incident.

20. The non-transitory computer-readable storage medium of claim 18, the operations further comprising:
generating feedback data based on the execution of the at least one candidate action;
updating the plurality of historic network data clusters based on the feedback data; and
training the network incident cause model based on the updated plurality of historic network data clusters.

\* \* \* \* \*